US007010215B2

(12) United States Patent
Hirosawa (10) Patent No.: US 7,010,215 B2
(45) Date of Patent: Mar. 7, 2006

(54) DEVICE AND METHOD FOR COMPRESSING IMAGES

(75) Inventor: Koji Hirosawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 563 days.

(21) Appl. No.: 10/123,449

(22) Filed: Apr. 15, 2002

(65) Prior Publication Data

US 2002/0110192 A1    Aug. 15, 2002

Related U.S. Application Data (63) Continuation of application No. 09/230,419, filed as application No. PCT/JP98/02278 on May 25, 1998, now Pat. No. 6,567,470.

(30) Foreign Application Priority Data

May 27, 1997   (JP)   ................................. 9-137113

(51) Int. Cl.
    *H04N 5/44*     (2006.01)
    *H04N 5/775*    (2006.01)
(52) U.S. Cl. ....................................................... 386/46
(58) Field of Classification Search .................. 386/46, 386/1, 124, 45, 125, 126, 52, 55; 348/734, 348/6, 731, 732, 565, 706; 341/176; H04N 5/44, H04N 5/775
See application file for complete search history.

(56) References Cited

U.S. PATENT DOCUMENTS

| 4,774,582 | A | * | 9/1988 | Hakamada et al. | .......... 348/565 |
| 4,811,085 | A | * | 3/1989 | Idei et al. | ................... 348/566 |
| 4,984,083 | A | * | 1/1991 | Okamoto et al. | ........... 348/565 |
| 5,369,441 | A | * | 11/1994 | Enari | .......................... 348/559 |
| 5,436,875 | A | * | 7/1995 | Shinada | .................... 369/30.23 |
| 5,493,414 | A | * | 2/1996 | Inoue et al. | ................... 386/52 |
| 5,650,827 | A | * | 7/1997 | Tsumori et al. | ................ 725/59 |
| 5,867,209 | A | * | 2/1999 | Irie et al. | ................. 348/14.15 |
| 5,956,452 | A | * | 9/1999 | Oketa et al. | .................... 386/1 |
| 5,959,690 | A |   | 9/1999 | Toebes, VIII et al. | |
| 6,028,979 | A | * | 2/2000 | Hirayama et al. | ............. 386/95 |
| 6,052,506 | A | * | 4/2000 | Fukushima et al. | ........... 386/46 |
| 6,094,521 | A |   | 7/2000 | Okayama et al. | |

(Continued)

FOREIGN PATENT DOCUMENTS

| JP | 9-18830 | 1/1997 |
| JP | 9-247620 | 9/1997 |

OTHER PUBLICATIONS

Cutting and Editing Video Sequences codedin MPEG-2, Rolf Hedtke et al., May 8, 1996, 17th Annual FKTG Convention.

*Primary Examiner*—Nhon Diep
(74) *Attorney, Agent, or Firm*—Frommer Lawrence & Haug LLP; William S. Frommer; Thomas F. Presson (57) ABSTRACT

Video decoder decodes pictures B0, B1, I2, B3 of GOP-3 which have been read out from a recording medium along with recording of new compressed picture data onto the recording medium thereafter to further decode pictures B4, P5, B6 . . . to restore them. Namely, it is impossible to restore, only by the compressed picture data of pictures B4, P5, B6. . . , these pictures corresponding thereto. For this reason, picture data of pictures B4, P5, B6. . . which have not been caused to be missing by recording of new compressed picture data are re-encoded to generate new GOP. Thus, the video decoder decodes and restores those non-missing pictures on the basis of the pictures B0, B1, I2, B3 within the new GOP.

8 Claims, 7 Drawing Sheets

U.S. PATENT DOCUMENTS

| | | |
|---|---|---|
| 6,198,769 B1 | 3/2001 | Mihara |
| 6,201,925 B1 * | 3/2001 | Brewer et al. ................. 386/52 |
| 6,370,324 B1 * | 4/2002 | Kawahara et al. .......... 386/109 |
| 6,430,361 B1 * | 8/2002 | Lee ............................. 386/98 |

* cited by examiner

DEVICE AND METHOD FOR COMPRESSING IMAGES

This is a continuation of application Ser. No. 09/230,419, now U.S. Pat. No. 6,567,470 filed Apr. 27, 1999, which is a 371 of PCT/JP98/02278, filed May 25, 1998.

TECHNICAL FIELD

This invention relates to a picture compression apparatus and a picture compression method suitable when used in an optical disc recording/reproducing apparatus.

BACKGROUND ART

Ordinarily, picture signals compression-encoded by the MEG (Moving Picture Experts Group) system are recorded on optical disc. In the MEG system, picture signals consisting of about 15 frames called GOP (Group Of Picture) are caused to be set of processing units, and those picture signals are encoded every the GOP.

Figure 1:
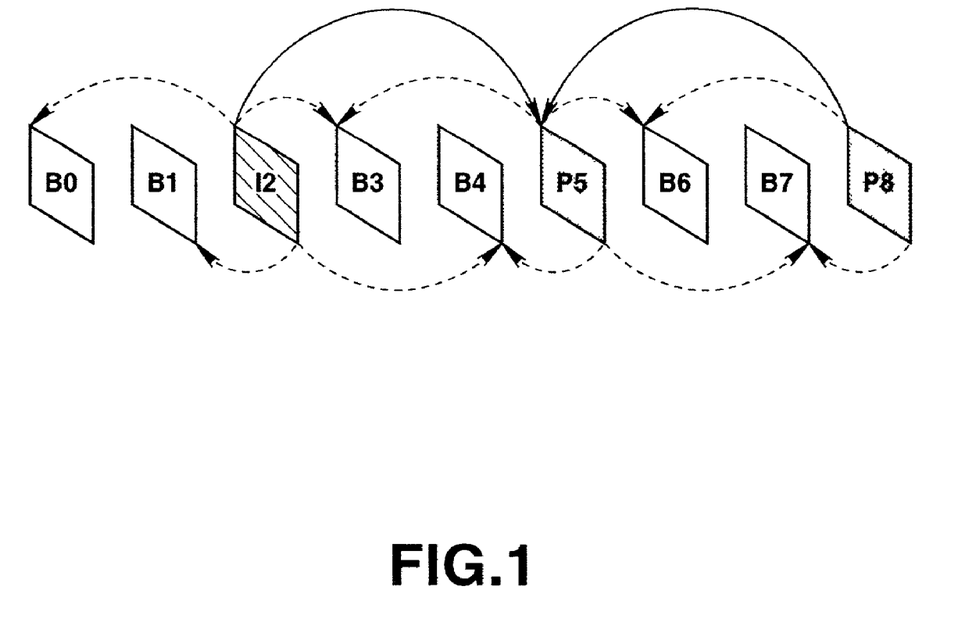
FIG. 1 is a view showing the configuration of GOP obtained in picture compression of the MEG system.

In one GOP, as shown in FIG. 1, there are I picture (Intra-Picture) (Intraframe encoded picture), P picture (Predictive-Picture) (Interframe forward direction predictive encoded picture), and B picture (Bidirectionally Predictive-picture) (Bidirectionally predictive encoded picture). I picture (picture I2) serves to maintain independence of GOP, wherein the entirety of that picture is encoded. P pictures (pictures P5, P8) are caused to undergo predictive encoding in forward direction from I picture or P picture. In this case, I picture and P picture are encoded in the same order as original picture In addition, B pictures (pictures B0, B1, B3, B4, B6, B7) are caused to bidirectionally undergo predictive encoding from I picture or P picture.

Conversely, in the case of decoding compression-encoded picture signal, picture I2 is decoded by itself as shown in FIG. 1, but pictures except for the picture I2 are not decoded only by their own picture signals.

However, when the first half portion of GOP including I picture is missing, P picture or B picture of the latter half of that GOP fails to be decoded.

Figure 2:
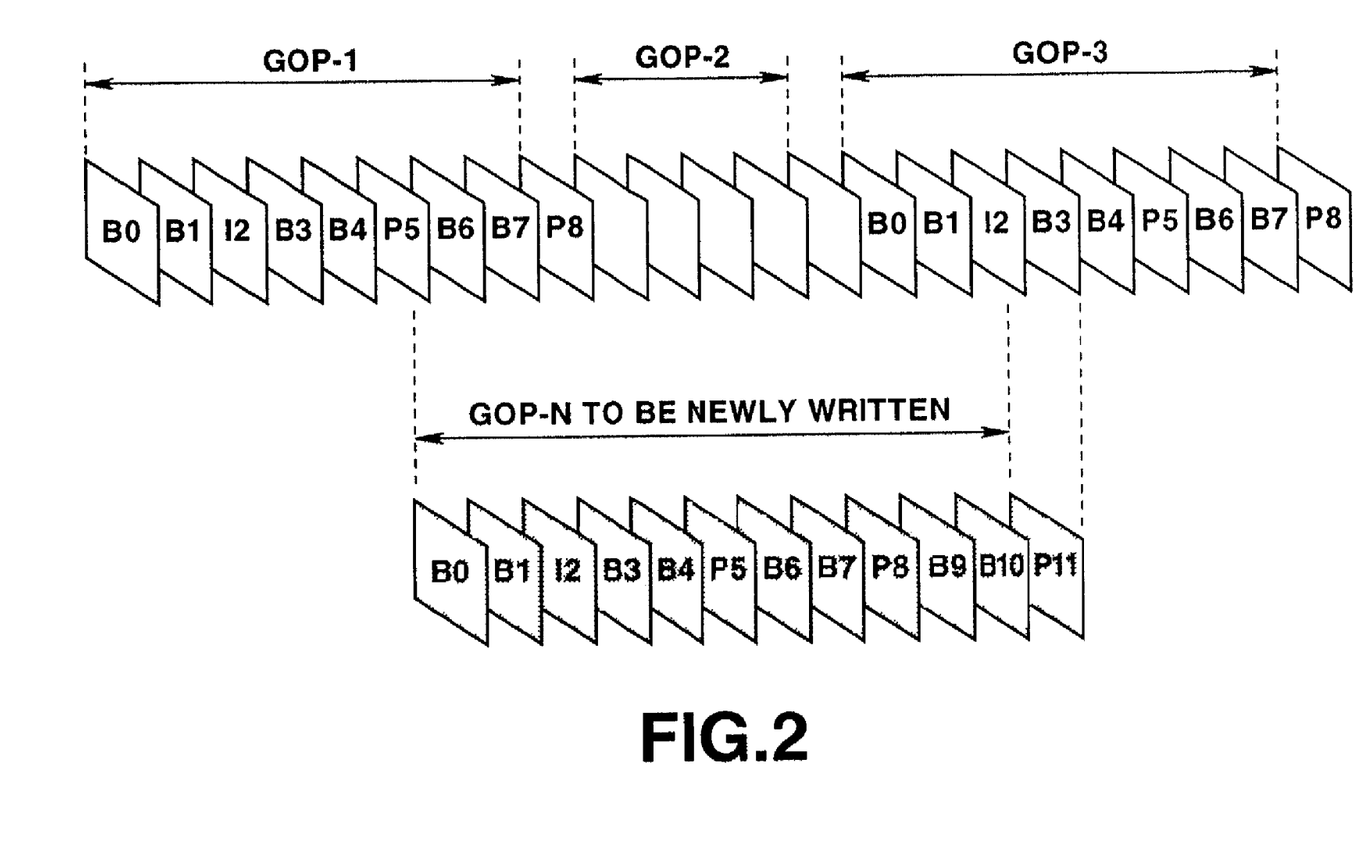
FIG. 2 is a view for explaining the case where new GOP is written onto recording medium.

For example, picture signals encoded every GOP-1, GOP-2, GOP-3 are assumed to be recorded, as shown in FIG. 2, on recording medium (not shown). Let now consider the case where picture signals from picture B6 of GOP-1 until picture B3 of GOP-3 are rewritten into picture signals of new GOP-N.

Figure 3:
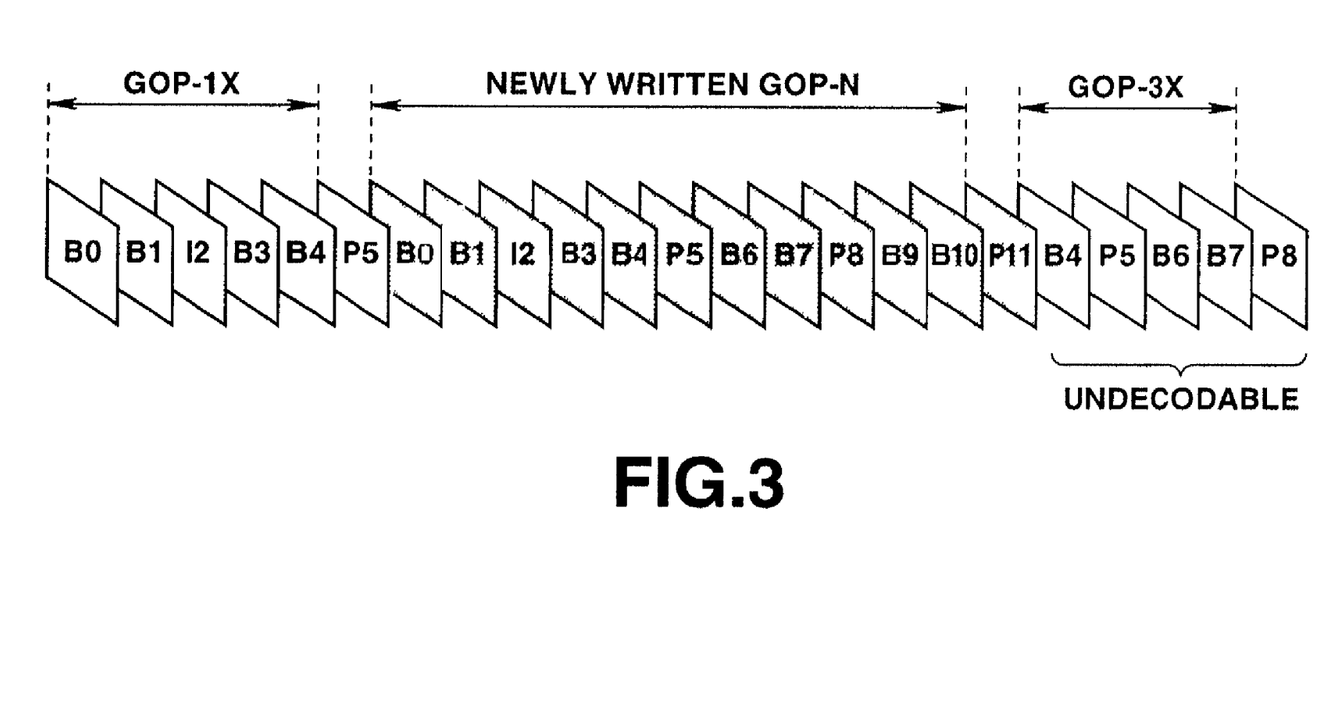
FIG. 3 is a view for explaining the case where new GOP has been written on recording medium.

As shown in FIG. 3, in the GOP-1X in which pictures B6, B7, B8 are missing, pictures until picture PS including I picture are not missing. Accordingly, pictures except for the missing pictures are decoded in an ordinary manner.

However, in the GOP-3X in which pictures B0, B1, I2, B3 of the first half portion are missing, I picture of that first half portion is also missing. Accordingly, pictures except for missing pictures would also fail to be decoded.

Namely, in the case where when picture signals compression-encoded by the MEG system are recorded on recording medium, compression-encoded other picture signals are further overwritten, there is not any problem if those picture signals are overwritten in GOP units. However, when picture signal of I picture of any other GOP is caused to be missing by the overwritten picture signals (in the case of units except for GOP unit), there took place the problem that as far as picture signals which are not missing fail to be decoded.

In order to avoid such problems, it is conceivable to rewrite picture signals every GOP. However, since those picture signals must be collectively rewritten every about 15 frames, such rewrite operation is very inconvenient. In addition, since picture signals are compression-encoded every respective one GOPs, it is impossible to rewrite those picture signals every pictures.

DISCLOSURE OF THE INVENTION

This invention has been proposed in view of such actual circumstances and its object is to provide a picture compression apparatus and a picture compression method which are capable of rewriting picture data in picture units in place of compression units.

In this invention, in the case where picture or pictures of (constituting) a portion of compression unit is or are missing, original compression unit in which the picture or pictures is or are missing is constructed as new compression unit to thereby solve the above-described problems.

Namely, a picture compression apparatus according to this invention is directed to a picture compression apparatus adapted for compressing picture data of plural pictures which correlate with each other to output compressed picture data every compression unit in which the plural pictures are compressed, the apparatus comprising: first compression means for compressing picture data to generate compression unit; and compression unit constructing means operative so that when picture or pictures of (constituting) the portion of the compression unit is or are missing, it constructs, as new compression unit, the original compression unit in which the picture or pictures of the portion thereof is or are missing.

It is preferable that, as the compression unit constructing means, there are provided expanding means operative so that when replacement into the different (new) compression unit is made so that picture or pictures of a portion of compression unit immediately after the different (new) compression unit is or are missing, it expands the original compression unit in which the picture or pictures is or are missing to generate original picture data, and second compression means for carrying out compression (of picture data of non-missing pictures of the original compression unit in order to expand (decode) the picture data of the non-missing pictures) by using the original picture data generated at the expanding means so as to construct the original compression unit in which the picture or pictures of the portion thereof is or are missing as new compression unit.

Further, it is preferable to alternately, in a time divisional manner, processing to expand, by the expanding means, original compression unit in which the picture or pictures of the portion thereof is or are missing to generate original picture data and processing to carry out compression (of picture data of non-missing pictures of the original compression unit in order to expand (decode) the picture data of the non-missing) by using the original picture data by the second compression means so as to construct the original compression unit in which picture or pictures is or are missing as new compression unit.

It is preferable that the expanding means carries out, with respect to the original compression unit, expansion at a speed higher than compression speed by the second compression means.

It is preferable that the second compression means compresses the original compression unit at a compression factor corresponding to data quantity of original picture data generated at the expanding means.

A picture compression method according to this invention is directed to a picture compression method of compressing picture data of plural pictures which correlate with each other to output compressed picture data every compression units in which the plural pictures are compressed, the method comprising: a first compression step of compressing picture data to generate compression unit; and a compression unit constructing step in which when picture or pictures of (constituting) the compression unit is or are missing, the original compression unit in which the picture or the pictures is or are missing is constructed as new compression unit.

It is preferable to comprise, as the compression unit constructing step, an expanding step in which when replacement into the different (new) compression unit is made so that picture or pictures of a portion of compression unit immediately after the different (new) compression unit is or are missing, the original compression unit in which the picture or pictures is or are missing is expanded to generate original picture data, and a second compression step of carrying out compression (of picture data of non-missing pictures of the original compression unit in order to expand (decode) the picture data of the non-missing pictures) by using the original picture data generated at the expanding step so as to construct the original compression unit in which the picture or pictures of the portion thereof is or are missing as new compression unit.

Further, it is preferable to alternately carry out, in a time divisional manner, processing to expand, by the expansion step, original compression unit in which the picture or pictures of the portion thereof is or are missing to generate original picture data, and processing to carry out compression (of picture data of non-missing pictures of the original compression unit in order to expand (decode) the picture data of the non-missing pictures) by using the original picture data by the second compression step so as to construct the original compression unit in which the picture or pictures of the portion thereof is or are missing as new compression unit.

It is preferable to carry out expansion, at the expansion step, with respect to the original compression unit, at a speed higher than compression speed by the second compression step.

It is preferable to compress, at the second compression step, the original compression unit at a compression factor corresponding to data quantity of original picture data generated at the expansion step.

BEST MODE FOR CARRYING OUT THE INVENTION

Best mode for carrying out this invention will now be described in detail with reference to the attached drawings.

Figure 4:
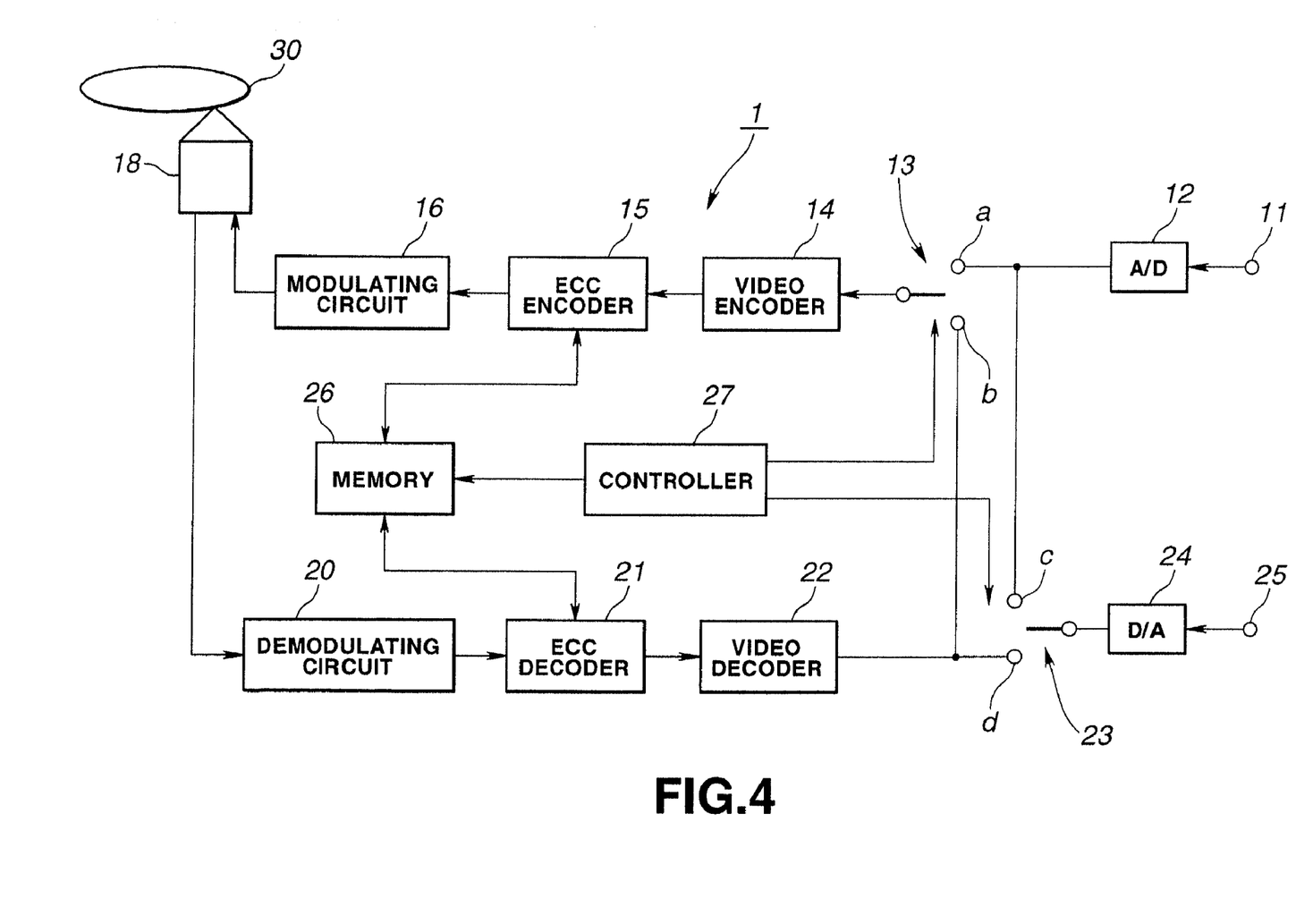
FIG. 4 is a block diagram showing more practical configuration of an optical disc recording/reproducing apparatus to which this invention is applied.

This invention can be applied to an optical disc recording/reproducing apparatus 1 of the configuration shown in FIG. 4, for example.

The optical disc recording/reproducing apparatus 1 according to the first embodiment comprises, as shown in FIG. 4, an A/D converter 12 for converting a picture signal into a signal in digital form, a first switching circuit 13 for outputting picture data from the A/D converter 12 or other picture data, a video encoder 14 for compression-encoding picture data, an ECC encoder 15 for adding error correction code, a modulating circuit 16 for carrying out modulation processing of the 8/16 conversion system, and an optical pick-up 18 for carrying out recording/reproduction of data by irradiation of laser beams.

The A/D converter 12 converts a picture signal delivered through an input terminal 11 into a signal in digital form to deliver picture data to terminal a of the first switching circuit 13.

The first switching circuit 13 is set to the terminal a or terminal b after undergone switching by controller 27 which will be described later to thereby deliver picture data inputted to the terminal a or the terminal b to the video encoder 14. In this example, the terminal b is connected to the output side of video decoder 22 which will be described later.

The video encoder 14 compression-encodes picture data consisting of about 15 frames every GOP (Group Of Picture) in which those picture data are caused to be processing unit by the predictive encoding of the MEG (Moving Picture Experts Group) system to deliver this compressed picture data to the ECC encoder 15. The ECC encoder 15 temporarily stores the compressed picture data from the video encoder 14 into a memory 26 to carry out encode processing of the error correction codes every ECC block. The ECC encoder 15 reads out such encoded compressed picture data from the memory 26 to deliver it to the modulating circuit 16.

The modulating circuit 16 allows the compressed picture data to undergo modulation processing of the 8/16 conversion system to deliver it to the optical pick-up 18. The optical pick-up 18 controls laser power on the basis of the compressed picture data delivered from the modulating circuit 16 to record this compressed picture data onto an optical disc 30.

Accordingly, the above-mentioned optical disc recording/reproducing apparatus 1 sets the first switching circuit 13 to the terminal a when the operation mode is the recording mode, thereby making it possible to record, onto the optical disc 30, picture signal inputted through the input terminal 11.

Moreover, the above-mentioned optical disc recording/reproducing apparatus 1 comprises, as shown in FIG. 4, a demodulating circuit 20 for carrying out demodulation processing, an ECC decoder 21 for carrying out error correction, a video decoder 22 for expanding compressed data into original picture data, a second switching circuit 23 for outputting picture data from the video decoder 22 or other picture data, a D/A converter 24 for converting picture data into a signal in analog form, the memory 26 for storing compressed picture data in ECC encode or ECC decode processing, and controller 27 for controlling the entirety.

The demodulating circuit 20 implements demodulation processing of the 8/16 conversion system to compressed picture data which has been read out from the optical pick-up 18 to deliver the compressed picture data thus demodulated to the ECC decoder 21. The ECC decoder 21 allows the memory 26 to store thereinto the demodulated compressed picture data from the demodulating circuit 20 to carry out decode processing of error correction codes every ECC blocks. The ECC decoder 21 allows the memory 26 to read out therefrom the compressed picture data in which error correction codes have been decoded to deliver it to the video decoder 22.

The video decoder 22 expands the compressed picture data compressed by the MEG system to restore (reconstruct) it into original picture data to deliver this picture data to terminal d of the second switching circuit 23.

The second switching circuit 23 is caused to undergo switching control by the controller 27 to deliver picture data inputted to terminal c or the terminal d to the D/A converter 24. In this example, the terminal c is connected to the above-described A/D converter 12. The D/A converter 24 converts picture data from the second switching circuit 23 into a signal in analog form to output a picture signal through an output terminal 25.

Accordingly, the controller 27 sets the second switching circuit 23 to the terminal d when the operation mode is reproduction mode, thereby making it possible to output, through the output terminal 25, the picture signal which has been read out from the optical disc 30 and has been expanded.

The editing mode when compressed picture data recorded on the optical disc 30 is rewritten will now be described.

In the case of the editing mode, the above-mentioned optical disc recording/reproducing apparatus 1 alternately carries out, in a time divisional manner, recording of new compressed picture data while reading out compressed picture data already recorded on the optical disc 30. In this case, such an approach is employed that when recording end position of newly recorded compressed picture data is located in the middle of GOP of the already recorded compressed picture data, compressed picture data which have been recorded at position succeeding to the recording end position are re-encoded to record them for a second time (hereinafter referred to as re-record as occasion may demand).

In more practical sense, the controller 27 sets the second switching circuit 23 to the terminal c when the operation mode is brought into the editing mode. At this time, by connecting monitor (not shown) to the output terminal 25, user can confirm picture inputted through the input terminal 11 on the monitor, and can thus prepare picture of the portion to be rewritten onto the optical disc 30. At this time, user sets in advance position at which compressed picture data is inserted with respect to the optical disc 30 (after picture P5 of GOP-1X shown in FIG. 5, for example). It is to be noted that, as position where compressed picture data is inserted, there is desirable a position such that even if missing of picture takes place by insertion, other pictures can be decoded. For example, in the case of GOP-1 shown in FIG. 2, positions after pictures I2, P5, P8 are desirable. When standby of editing is completed, the controller 27 sets the first switching circuit 13 to the terminal a to start editing.

Initially, the optical pick-up 18 reads out compressed picture data of a predetermined number of ECC blocks recorded on the optical disc 30, e.g., at double speed to deliver compressed picture data consisting of ECC blocks to the ECC decoder 21 through the demodulating circuit 20. The ECC decoder 21 allows the memory 26 to store thereinto the compressed picture data delivered from the demodulating circuit 20 to implement error correction processing to compressed picture data stored in the memory 26.

The controller 27 allows the memory 26 to read out the predetermined number of ECC blocks stored therein. The ECC decoder 21 delivers, to the video decoder 22, compressed picture data consisting of the predetermined number of ECC blocks which have been read out from the memory 26. The video decoder 22 expands the compressed picture data delivered thereto to restore (reconstruct) such data into original picture data to output it.

On the other hand, the ECC encoder 15 allows the memory 26 to store thereinto compressed picture data delivered from the video encoder 14 to add error correction codes to the compressed picture data stored in the memory 26 to generate ECC blocks.

The controller 27 allows the memory 26 to read out the predetermined number of ECC blocks stored therein. The ECC encoder 15 delivers the compressed picture data consisting of the predetermined number of ECC blocks which have been read out from the memory 26 to the optical pick-up 18 through the modulating circuit 16. The optical pick-up 18 writes the compressed picture data onto the optical disc 30, e.g., at double speed.

As stated above, the optical pick-up 18 alternately carries out, in a time divisional manner, read-out of the above-described compressed picture data and recording of compressed picture data every predetermined number of ECC blocks.

Figure 5:
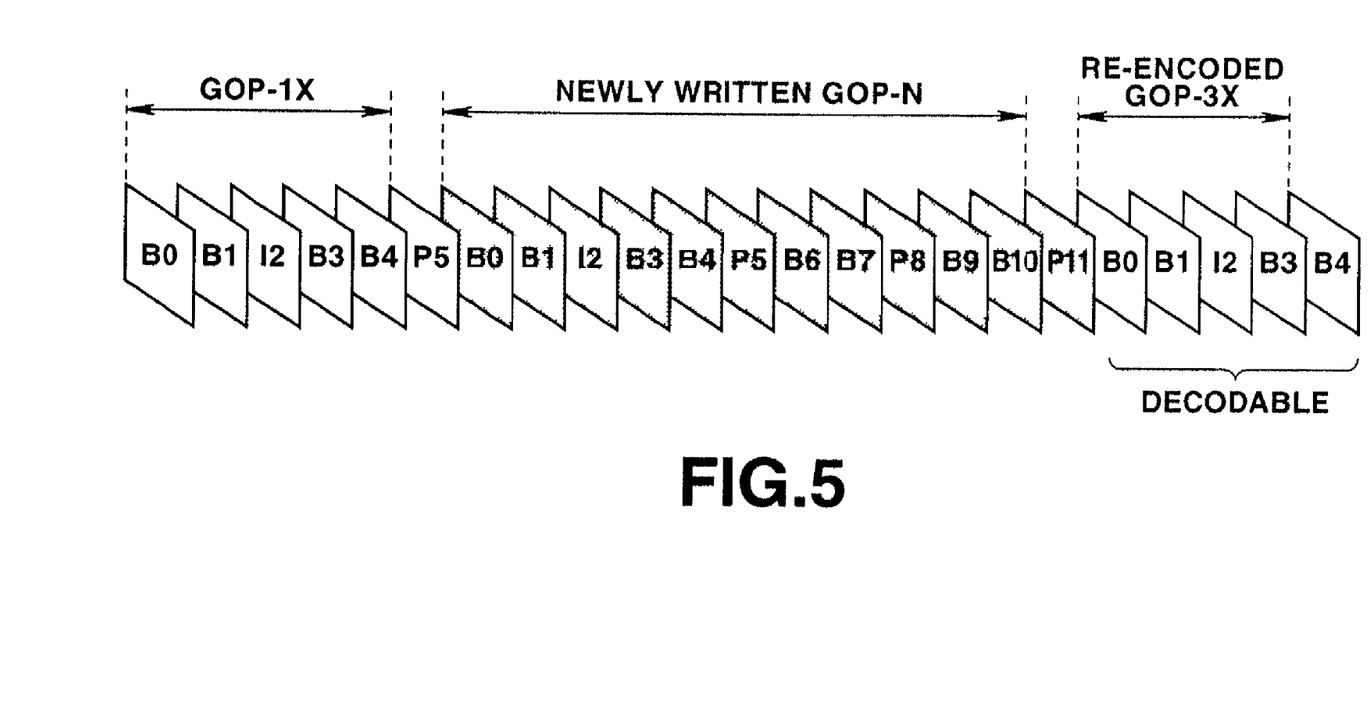
FIG. 5 is a view showing the configuration of GOP recorded on recording medium by the optical disc recording/reproducing apparatus shown in FIG. 4.

In this case, the above-mentioned optical disc recording/reproducing apparatus 1 is operative so that when recording end position (picture P11) of GOP-N which is compressed picture data newly recorded on the optical disc 30 exists in the middle of GOP-3 already recorded on the optical disc 30 as shown in FIG. 2, for example, the apparatus 1 re-encodes pictures B4, P5, B6 . . . of GOP-3 to generate GOP-3N which is new GOP as shown in FIG. 5.

In more practical sense, the controller 27 controls the optical pick-up 18, etc. to record GOP-N which is new compressed picture data, and to also carry out decode processing of pictures B0, B1, I2, B3 of GOP-3 shown in FIG. 2. When recording of the GOP-N is completed, GOP-1X immediately before the GOP-N is constructed as new GOP in which pictures subsequent (succeeding) to picture P5 are missing.

The controller 27 sets the first switching circuit 13 to the terminal b after recording of GOP-N is completed, and controls the optical pick-up 18 so as to read out compressed picture data of pictures B4, P5, B6 . . . shown in FIG. 2. The compressed picture data which have been read out from the optical pick-up 18 are delivered to the video decoder 22 through the demodulating circuit 20, and the ECC decoder 21.

The video decoder 22 restores (reconstructs) pictures B4, P5, B6 . . . on the basis of pictures B0, B1, I2, B3 of GOP-3 which have been read out and have been decoded along with recording of the above-described new compressed picture data. Namely, because it is impossible to restore (reconstruct), only by the compressed picture data of pictures B4, P5, B6 . . . which have been read out, these pictures corresponding thereto, the video decoder 22 restores (reconstructs) the above-mentioned pictures B4, P5, B6 . . . on the basis of the pictures B0, B1, I2, B3 which have been read out and have been restored along with recording of compressed picture data in a manner as described above. Further, the video decoder 22 delivers picture data of pictures B4, P5, B6 . . . to the video encoder 14 through the first switching circuit 13.

The video encoder 14 encodes, for a second time, (re-encodes) pictures B4, P5, B6 . . . of GOP-3 to newly generate compressed picture data consisting of GOP-3N as shown in FIG. 5.

Namely, by newly writing GOP-N, GOP-1X immediately therebefore and GOP-3N immediately thereafter are also constructed as new GOP.

Further, the video encoder 14 delivers compressed picture data of GOP-3N to the optical pick-up 18 through the ECC encoder 15 and the modulating circuit 16. The optical pick-up 18 records the compressed picture data of GOP-3N onto the optical disc 30 to complete the editing processing.

As stated above, the above-mentioned optical disc recording/reproducing apparatus 1 is operative so that when recording end position of newly recorded compressed picture data exists in the middle of GOP of the already recorded compressed picture data, the apparatus 1 re-encodes the compressed picture data recorded at the position succeeding to the recording end position to newly record GOP. Namely, the above-mentioned optical disc recording/reproducing apparatus 1 re-encodes GOP in which data are missing to generate new GOP to thereby avoid the fact that pictures of a portion of GOP are missing so that as far as other pictures of the GOP fail to be restored, thus making it possible to carry out, many times, editing processing of compressed picture data compressed by the MEG system.

Moreover, since the optical disc recording/reproducing apparatus 1 allows user to select the portion after picture P5 of GOP-1X shown in FIG. 5 to carry out write processing of new compressed picture data from that portion, it is possible to effectively restore pictures of pictures B0 to P5 of GOP-1X as well.

In other words, the above-mentioned optical disc recording/reproducing apparatus 1 is adapted so that even in the case where picture or pictures of a portion of each GOP is or are missing when respective portions of plural GOPs already constructed are replaced into another (new) GOP-N, the original GOP-1, GOP-3 in which their portions of the pictures are missing are respectively constructed as new GOP-1X, GOP-3N, thereby making it possible to carry out normal decode processing in which there is no missing in picture at the time of reproduction.

It is to be noted that the video encoder 14 may encode GOP-3N at a compression factor corresponding to data quantity of picture of GOP-3 caused to be missing by GOP-N newly written. Namely, the video encoder 14 may be adapted so that when the number of missing pictures is large, it carries out encode processing in the state where the compression factor is caused to be relatively low, while when the number of missing pictures is small, it carries out encode processing in the state where the compression factor is caused to be relatively high. Thus, position of the last picture of original GOP-3 and position of the last picture of new GOP-3N are permitted to be in correspondence with each other. Thus, smooth decode processing can be carried out at the time of reproduction.

Further, in the ECC encode processing in the ECC encoder 15 and in the ECC decode processing in the ECC decoder 21, shared memory 26 is used without respectively using peculiar memories. Accordingly, substrate occupation area by memory can be reduced as compared to the prior art, and reduction of the production cost can be also realized.

An optical disc recording/reproducing apparatus according to the second embodiment will now be described. It is now assumed that the same reference numerals are respectively attached to the same circuits as those of the first embodiment and the detailed explanation will be omitted.

Figure 6:
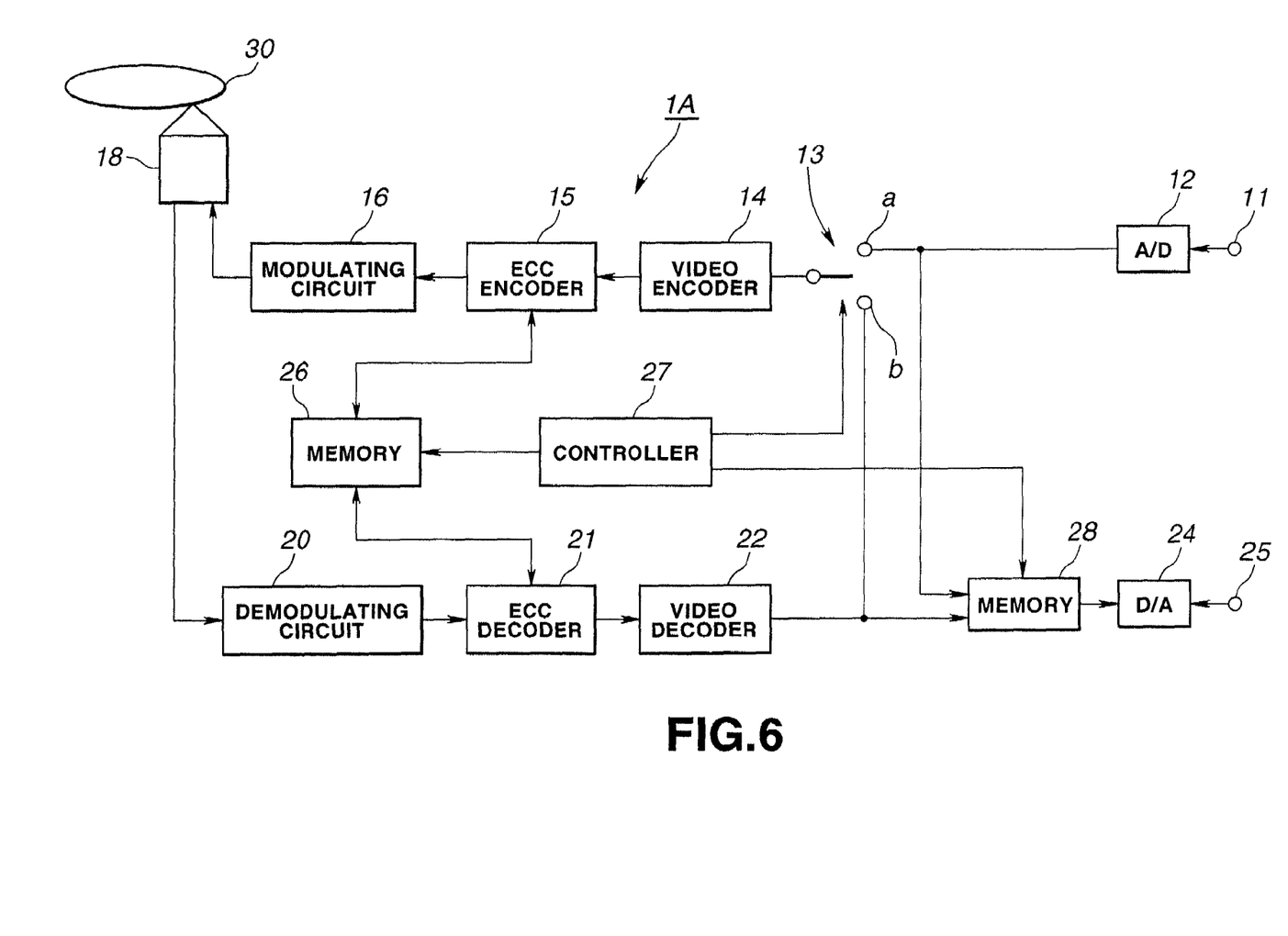
FIG. 6 is a block diagram showing a more practical configuration of an optical disc recording/reproducing apparatus according to another embodiment.

An optical disc recording/reproducing apparatus 1A is provided with a memory 28, as shown in FIG. 6, in place of the second switching circuit 23 of the above-described optical disc recording/reproducing apparatus 1.

Into the memory 28, picture data from A/D converter 12 is written and picture data from video decoder 22 is also written. Accordingly, picture data of recording picture inputted through input terminal 11 and picture data of reproduction picture from the video decoder 22 are stored into the memory 28. These picture data are read out by controller 27 and are delivered to D/A converter 24.

Figure 7:
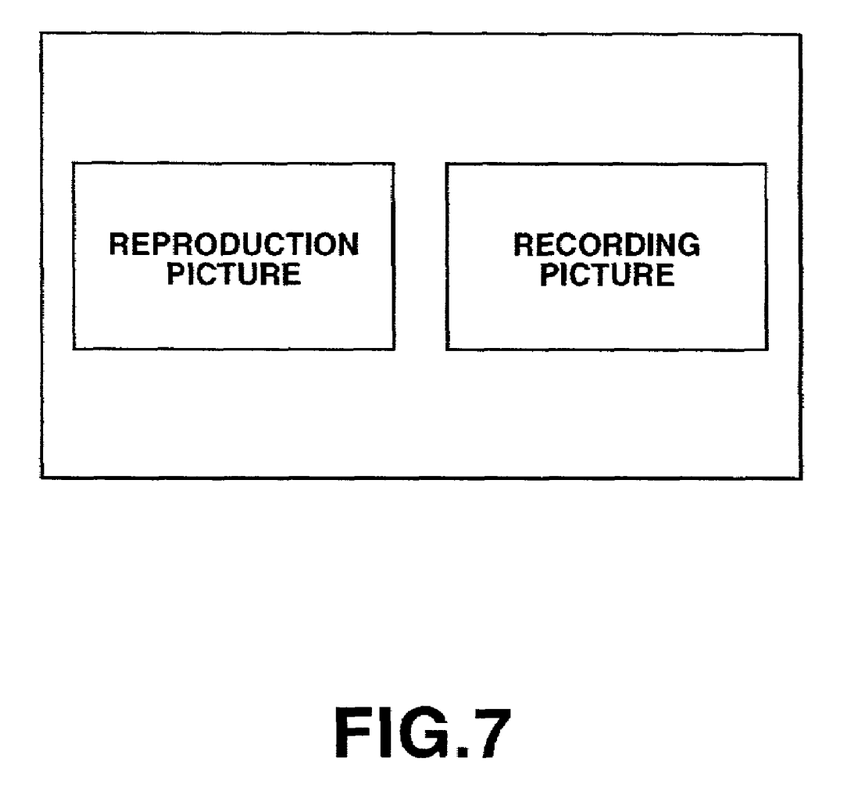
FIG. 7 is a view showing image outputted from the optical disc recording/reproducing apparatus shown in FIG. 6.

Accordingly, the optical disc recording/reproducing apparatus 1A permits the memory 28 to store thereinto picture data to be newly overwritten from now and picture data already recorded on the optical disc 30 to read out therefrom such data. Accordingly, as shown in FIG. 7, recording picture and reproduction picture can be displayed at the same time on monitor connected through output terminal 25. Thus, user is permitted to easily carry out editing work.

It is to be noted that while this invention is not limited to the above-described embodiments, but it is a matter of course that various modifications or changes in design may be made within the range of the technical idea described in the scope for Patent Claims. While, e.g., in the embodiments, explanation has been given by taking the example of the case where compressed picture data are recorded onto optical disc 30, recording media such as magnetic disc, magnetic tape or semiconductor memory, etc. may be applied in addition to the above.

What is claimed is:

1. Recording/reproducing apparatus, comprising:
    a recording/reproducing unit operable to record/reproduce video data onto/from a recording medium;
    a decoder operable to decode the video data reproduced from said recording medium;
    a video memory operable to store the decoded video data and input video data; and
    a controller operable to cause said decoded video data and input video data stored in the video memory to be displayed on a display simultaneously.

2. The recording/reproducing apparatus according to claim 1, further comprising:
    an encoder operable to encode the input video data.

3. The recording/reproducing apparatus according to claim 1, wherein said controller arranges the position of the displayed data so that the decoded video data and input video data are displayed side by side.

4. The recording/reproducing apparatus according to claim 1, wherein said recording/reproducing unit performs recording and reproducing in a time divisional manner.

5. A recording/reproducing method comprising the steps of:
    recording/reproducing video data onto/from a recording medium;
    decoding the video data reproduced from said recording medium;
    storing the decoded video data and input video data; and
    causing said stored decoded video data and input video data to be displayed on a display simultaneously.

6. The method of claim 5, further comprising the step of encoding the input video data.

7. The method of claim 5, wherein decoded video data and input video data am displayed side by side.

8. The method of claim 5, wherein said recording and reproducing are performed in a time divisional manner.

* * * * *